(12) United States Patent
Johnson et al.

(10) Patent No.: US 9,569,658 B2
(45) Date of Patent: Feb. 14, 2017

(54) IMAGE SHARING WITH FACIAL RECOGNITION MODELS

(71) Applicant: Shutterfly, Inc., Redwood City, CA (US)

(72) Inventors: Andrea R. Johnson, Palo Alto, CA (US); Matthew J. Johnson, Palo Alto, CA (US); Nico Toutenhoofd, Boulder, CO (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 14/959,734

(22) Filed: Dec. 4, 2015

(65) Prior Publication Data

US 2016/0086022 A1    Mar. 24, 2016

Related U.S. Application Data

(63) Continuation of application No. 14/328,452, filed on Jul. 10, 2014, now Pat. No. 9,241,018, which is a continuation of application No. 13/525,134, filed on Jun. 15, 2012, now Pat. No. 8,798,401.

(51) Int. Cl.
| | | |
|---|---|---|
| *G06K 9/00* | (2006.01) | |
| *G06F 17/30* | (2006.01) | |
| *G06F 21/62* | (2013.01) | |
| *H04L 29/06* | (2006.01) | |
| *G06K 9/46* | (2006.01) | |

(52) U.S. Cl.
CPC ..... *G06K 9/00288* (2013.01); *G06F 17/30244* (2013.01); *G06F 17/30256* (2013.01); *G06F 21/6218* (2013.01); *G06K 9/00677* (2013.01); *G06K 9/4642* (2013.01); *H04L 65/403* (2013.01)

(58) Field of Classification Search
CPC ............ G06K 9/00288; G06K 9/00221; G06K 9/00677; G06F 17/30244; G06F 21/6218
USPC ........................ 382/115, 118, 209, 218, 305
See application file for complete search history.

(56) References Cited

U.S. PATENT DOCUMENTS

| | | | |
|---|---|---|---|
| 7,966,565 B2 | 6/2011 | Dawson | |
| 8,180,112 B2 * | 5/2012 | Kurtz | G06K 9/00288 382/103 |
| 8,447,769 B1 | 5/2013 | Paris | |
| 8,655,028 B2 * | 2/2014 | Hsi | G06K 9/00288 382/118 |
| 9,143,601 B2 * | 9/2015 | Padmanabhan | H04W 4/206 |
| 2011/0064281 A1 | 3/2011 | Chan | |
| 2011/0148857 A1 | 6/2011 | Krupka | |
| 2013/0194438 A1 * | 8/2013 | Sweet, III | G06K 9/00221 348/207.1 |

* cited by examiner

*Primary Examiner* — Daniel Mariam
(74) *Attorney, Agent, or Firm* — Xin Wen

(57) ABSTRACT

An image sharing server provides several ways of sharing images between users. After a user contributes images to the image sharing server, the user can interact with the image sharing server to identify and tag people in the images, share the images with other users, and organize the images into memory boxes. Memory boxes can also be shared between users, and multiple users can be granted the ability to add images to a shared memory box. In addition, the image sharing server can prompt a user to share his or her images with other users who contributed related images. The image sharing server also performs facial recognition to automatically identify people in images, and facial recognition models can be shared between users.

14 Claims, 7 Drawing Sheets

IMAGE SHARING WITH FACIAL RECOGNITION MODELS

BACKGROUND

1. Technical Field

This invention pertains in general to online storage and management for multimedia and in particular to methods of sharing images between users of an image sharing server.

2. Description of Related Art

Digital cameras have become a widespread tool for capturing photographs and videos. It is common for a typical user to own and use multiple digital cameras, such as a camera integrated into a mobile phone, a webcam attached to a home computer, a point-and-shoot camera, and a digital single-lens reflex (DSLR) camera. It is also common for multiple users attending the same event to take photos and videos of the event from different angles and at different times. As a result, related photos and videos are saved to storage devices on many different cameras, mobile phones, and computers, and it is difficult and inconvenient for users to organize these photos and videos and share them with each other.

Some users might organize and share their photos and videos by uploading them to an online multimedia hosting service, such as FLICKR®, PHOTOBUCKET®, VIMEO®, or YOUTUBE®. Many users register for these hosting services because they wish to make their own photos and videos available to their friends and family and to view related photos and videos that were taken by others. However, content sharing methods on current hosting services are completely manual. Thus, if a user wishes to view photos and videos that were taken by other users at the event, the user must actively search for the other users and browse through their photo and video libraries to find the desired content. This makes it difficult for users to discover relevant photos and videos taken by others and efficiently share their own photos and videos with their friends and family.

SUMMARY

Embodiments of the invention include a method, a non-transitory computer readable storage medium and a system for sharing a set of images between users. A memory box is created on an image sharing server. The memory box defines a set of images that were contributed to the image sharing server by a first user. The first user can subsequently share the memory box with a second user, which allows the second user to view the images in the memory box. The first user can optionally grant the second user permission to modify the memory box by adding or removing images or modifying the metadata of images in the memory box.

Other embodiments of the invention include a method, a non-transitory computer readable storage medium and a system for prompting a user to share an image. The image sharing server receives an image uploaded by a user and searches for related images that are already stored on the server. A stored image is determined to be related to the uploaded image if the stored image was taken at a similar time and was also taken at a similar location or contained a similar group of people. If a related image is found, then the uploading user is prompted to share the uploaded image with the user who contributed the related image.

Still other embodiments of the invention include a method, a non-transitory computer readable storage medium and a system for sharing a facial recognition model. The image sharing server generates a facial recognition model of a person based on images of the person that were contributed by a first user, and the facial recognition model is stored in association with the first user. When the first user shares an image of the person with a second user, the facial recognition model of the person is also automatically shared with the second user. The facial recognition model can be used to help identify the person in images that were contributed by the second user.

Embodiments of the invention also include a method, a non-transitory computer readable storage medium and a system for calculating a charge for using the image sharing server. The image sharing server stores images in association with a user account, and instead of charging users based on the storage space used for the images, the image sharing server determines a service charge based on the number of images that are stored for the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide an image sharing server that allows users to store their images and optionally share their images with other users. The image sharing server provides several beneficial ways of sharing images between users. A user may create memory boxes that hold a collection of images, and memory boxes may be shared between users. The user who creates the memory box may allow other users to contribute their own images to the memory box, which beneficially allows the memory box to be used as a shared online repository for images that were taken by several different users.

The image sharing server also analyzes contributed images to find related images based on the time at which the images were taken, and either the location where the images were taken or the people that are recognized in the image. If related images are found, the corresponding users can be prompted to share their images with each other. Since this process of prompted sharing automatically finds related images, a user does not need to manually browse through the image libraries of other users to find other images that were taken at an event the user attended.

The image sharing server also performs facial recognition on contributed images and generates facial recognition models for people who are recognized in the contributed images. Each facial recognition model is associated with a specific user and can be refined as the user uploads more images of the person represented in the model. When a first user shares images of a person with a second user, the first user's facial recognition model of the person can also be shared with the second user, and the shared model can subsequently be applied to recognize the person in the second user's images. However, the images that were used to generate and refine the first user's model are not shared with the second user unless the first user explicitly shares the images. This is beneficial because the second user can receive access to a more refined and reliable facial recognition model, but the privacy preferences of the first user are preserved because not all of the first user's images of the person are shared.

Figure 1:
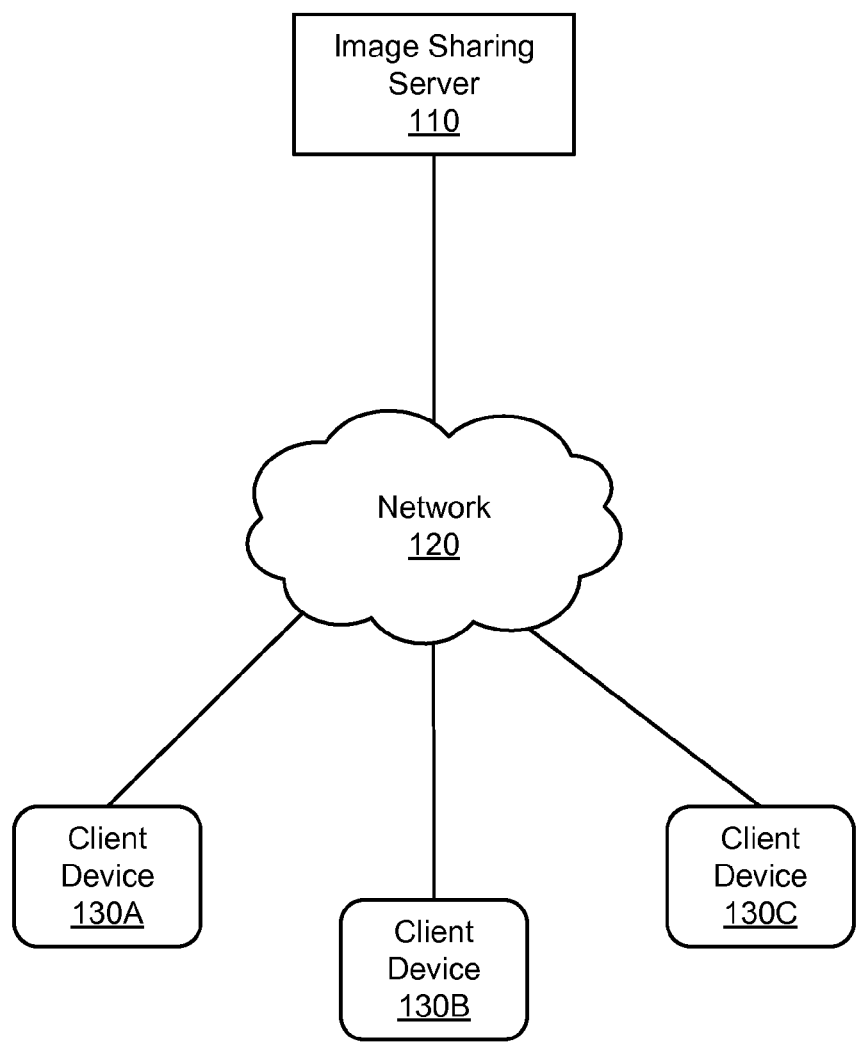
FIG. 1 is a network diagram of a system environment for sharing images, in accordance with an embodiment of the invention.

FIG. 1 is a network diagram of a system environment 100 for sharing images, in accordance with an embodiment of the invention. The system environment 100 includes an image sharing server 110, a network 120, and client devices 130A, 130B, and 130C (collectively 130). Although only three client devices 130 are shown in FIG. 1 in order to clarify and simplify the description, a typical embodiment of the system environment 100 may include thousands or millions of client devices 130 connected to image sharing server 110 over the network 120.

The image sharing server 110 receives images from the client devices 130 and performs a wide variety of tasks related to storing and sharing the images. After a user contributes images to the image sharing server 110, the contributing user can interact with the image sharing server 110 to share the images with other users, organize the images into memory boxes, identify and tag people in the images, and perform many other tasks. In addition, the image sharing server 110 can analyze the metadata of contributed images to find related images and perform facial recognition to automatically identify and tag recognized people in images. A detailed description of the image sharing server 110 is provided with reference to FIG. 2.

The network 120 relays communications between the image sharing server 110 and the client devices 130. In one embodiment, the network 120 uses standard internet communications technologies and/or protocols. Thus, the network 120 can include link technologies such as Ethernet, IEEE 802.11, IEEE 806.16, WiMAX, 3GPP LTE, integrated services digital network (ISDN), asynchronous transfer mode (ATM), and the like. Similarly, the networking protocols used on the network 120 can include the transmission control protocol/Internet protocol (TCP/IP), the hypertext transport protocol (HTTP), the simple mail transfer protocol (STMP), the file transfer protocol (FTP), and the like. The data exchanged over the network 120 can be represented using a variety of technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

The client devices 130 are electronic devices that are capable of communicating with the image sharing server 110 over the network 120. For example, a client device 130 may be a smartphone, a personal digital assistant (PDA), a tablet computer, a laptop computer, or a desktop computer. A client device 130 may optionally include an integrated camera so that the device can be used to immediately upload an image to the image sharing server 110 after capturing the image.

A single user may use multiple client devices 130 to interact with the image sharing server 110 using the same user account. For example, a user can use a first client device 130A (e.g., a smartphone) to capture an image, and upload the image to the image sharing server 110 using his or her user account. Later, the same user can use a second client device 130B (e.g., a desktop computer) to access the same user account and share the uploaded image with a different user of the image sharing server 110.

Figure 2:
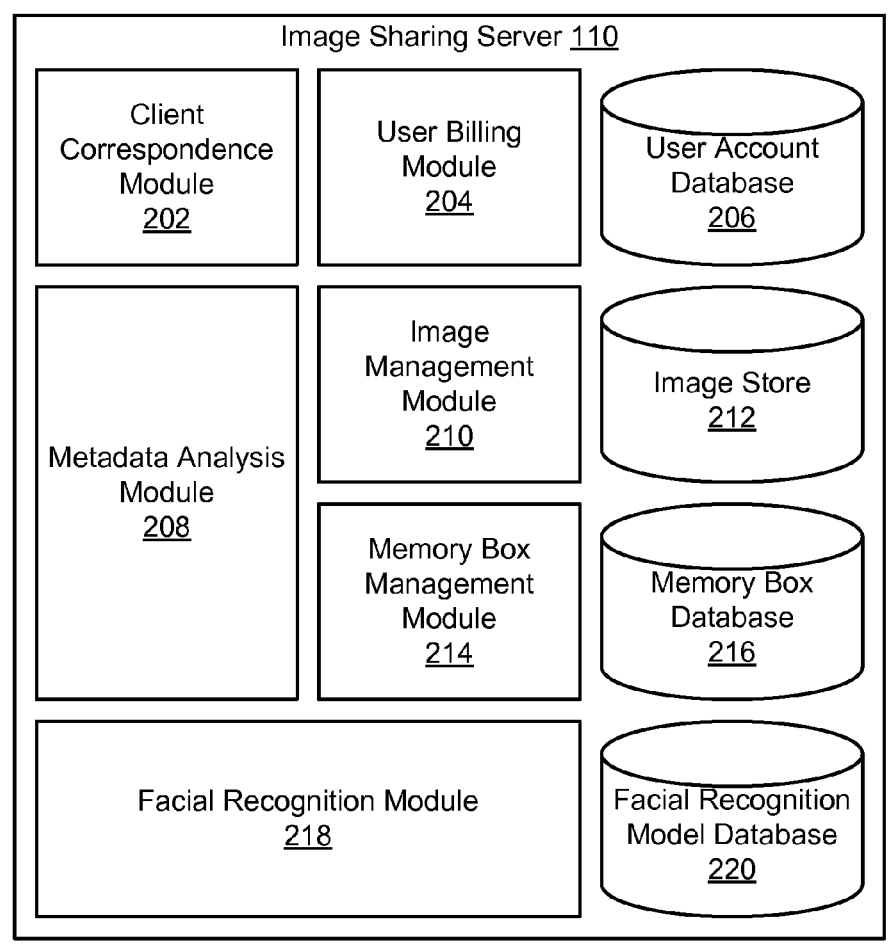
FIG. 2 is block diagram of the image sharing server depicted in FIG. 1, in accordance with an embodiment of the invention.

FIG. 2 is block diagram of the image sharing server 110 depicted in FIG. 1, in accordance with an embodiment of the invention. The image sharing server 110 includes a client correspondence module 202, a user billing module 204, a user account database 206, a metadata analysis module 208, an image management module 210, an image store 212, a memory box management module 214, a memory box database 216, a facial recognition module 218, and a facial recognition model database 220.

The client correspondence module 202 connects to the client devices 130 over the network 120 and handles communications between the image sharing server 110 and the client devices 130. The client correspondence module 202 receives communications from users, such as uploaded images and requests to share images and memory boxes, and passes the communications to the appropriate modules. The client correspondence module 202 also receives outgoing data, such as images and notifications, from the other modules and sends the data to the appropriate client devices 130.

The user billing module 204 establishes usage limits and receives payments from users of the image sharing server 110 as a service charge for using the server 110. Instead of setting a limit on the total storage space that can be allocated to store a user's content (e.g., 10 gigabytes) for a given fee, the user billing module 204 may establish a limit on the total number of photos and minutes of video that can be stored for a user for a given fee. The fee may be assessed as a one-time payment, or on a periodic basis such as monthly or yearly. To provide a user with more flexibility within this limit, the user billing module 204 can define a ratio between a minute of video and a number of photos so that a user can store an arbitrary combination of photos and video within the same limit. For example, suppose the user billing module 204 allows a user to store a maximum of 20,000 photos or 600 minutes of video for a fixed monthly fee. In this case, the ratio would be approximately 33 photos for one minute of video, and the user could store, for example, 5000 photos and 450 minutes of video, 10,000 photos and 300 minutes of video, or 15,000 photos and 150 minutes of video, or some other combination of photos and video. Alternatively, the user could use the limit to store 20,000 photos and no video, or 600 minutes of video and zero photos.

The user billing module 204 may also allow a user to select from different levels of service. For example, a first level of service could allow the user to store a maximum of 1000 photos or 60 minutes of video for no monthly fee, a second level of service could allow the user to store a maximum of 20,000 photos or 600 minutes of video for a small monthly fee, and a third level of service could allow the user to store a maximum of 50,000 photos or 1500 minutes of video for a higher monthly fee. The levels of service can be configured to have the same ratio between video and photos, or they can be configured to have different photo-video ratios.

To help control the cost of storing photos and videos in this manner, the user billing module 204 can optionally define a maximum image size for photos and videos and instruct the image management module 210 to scale larger images down to the maximum size. For example, any photo with a width greater than 3000 pixels might be scaled down to have a width of 3000 pixels. Similarly, any video with a resolution greater than 720p might be scaled down to a resolution of 720p. The user billing module 204 may also instruct the client correspondence module 202 to notify the user any time the user's content is scaled down. This allows the image sharing server 110 to maintain the simplicity of the pricing system described above while reducing the probability that the server 110 will be overloaded with high-resolution photos and videos that would be disproportionally expensive to store.

The user account database 206 stores user accounts that contain information associated with users of the image sharing server 110. In one embodiment, each user account contains a unique identifier for the account, at least one piece of contact information for the corresponding user (e.g., an email address), billing data for the user (e.g., a user-selected level of service, credit card information), and links to the user's accounts on external social networking services (e.g., FACEBOOK® or TWITTER®). A user account can also be a shared account that contains contact information, billing data, or social networking links corresponding to two users. Shared accounts allow two people (e.g., a married couple, close friends, or two people with some other relationship) to access the image sharing server 110 using the same user account while respecting that the two people are individuals with different identities. This beneficially allows the two people to use their respective client devices 130 to contribute images using the same user account. For example, two parents with a shared account could use their smart phones to capture and contribute images of a soccer game from two different vantage points, and the images from both parents can automatically be added to the same memory box. Since a user account is likely to contain sensitive data, the user account database 206 may be encrypted or subject to other data security techniques to protect the privacy of the users.

The metadata analysis module 208 receives images and analyzes the metadata in the images to find related images in the image store 212. In one embodiment, the metadata analysis module 208 contains submodules that attempt to match individual types of metadata. For example, the module 208 may contain a subject matching submodule for finding other images that include the same people, a timestamp analysis submodule for finding other images that were taken at approximately the same time, and a location analysis submodule for finding other images that were taken at approximately the same location. In alternative embodiments, the module may also contain submodules for matching different types of metadata. The metadata analysis module 208 can then aggregate the results from the submodules to generate a list of related images. As described below with reference to FIG. 3, the metadata analysis module 208 can also use the results from the submodules to refine the location data 310 and activity 314 that are defined for an image 300.

The image management module 210 manages the images in the image store 212. As used herein, an image is a media item that contains visual content, such as a photograph or a video captured by a user, and at least one item of metadata that describes the visual content. A detailed description of an example image 300 is presented below with reference to FIG. 3. The image management module 210 can modify an item of metadata in an image after receiving a corresponding request from a user (via the client correspondence module 202) or from a different module of the image sharing server 110, such as the facial recognition module 218. The image management module 210 can also modify the visual content of an image. For example, the image management module 210 may receive instructions from the user billing module 204 to scale images down to a predefined maximum width.

The image management module 210 also processes requests to add or remove images from the image store 212. An image is typically added to the image store 212 after a user uploads the image to the image sharing server 110. In some embodiments, the image management module 210 may also create a copy of an image that was previously added to the image store 212. The image management module 210 can remove an image from the image store 212 after receiving a request from the user who uploaded the image.

The memory box management module 214 creates and deletes memory boxes in the memory box database 216. As used herein, a memory box is an object that defines a collection of images in the image store 212, and a detailed description of an example memory box is presented below with reference to FIG. 4. After a new user account is opened, the memory box management module 214 automatically creates a primary memory box, and all of the user's uploaded images are added to the primary memory box by default. The memory box management module 214 can also create additional memory boxes for a user account. A user may submit requests to create additional memory boxes as a way of categorizing and organizing their images on the image sharing server 110. For example, a user might wish to create separate memory boxes for images of his child's soccer games, his pet rabbit, and his vacations. Users may also submit requests to delete memory boxes that they have created, and these requests are also processed by the memory box management module 214.

The memory box management module 214 also receives and processes requests to share memory boxes. After receiving a sharing request, either from the client correspondence module 202 or a different module of the image sharing server 110, the memory box management module 214 accesses the requested memory box in the memory box database 216 and makes the requested change to the sharing settings of the requested memory box.

The facial recognition module 218 receives images and identifies the people in the images using facial recognition models stored in the facial recognition model database 220. The module 218 may use any facial recognition algorithm that is known in the art or may communicate with a third-party provider of facial recognition services. These algorithms and service providers typically employ statistical techniques such as principal component analysis, linear discriminate analysis, or Hidden Markov models. The module 218 may also use the facial recognition method described in co-pending U.S. patent application Ser. No. 13/525,037, which has been incorporated by reference herein.

The facial recognition model database 220 stores facial recognition models that were generated by the facial recognition module 218. Each facial recognition model represents a subject's face and can be used to identify the subject in subsequent images that are received by the facial recognition module 218. In one embodiment, each facial recognition model is stored in association with a user account, and the facial recognition module 218 refines the model as the subject is identified in additional images that are uploaded by the associated user account. In other words, as a subject is identified in additional images, the facial recognition model for the subject becomes more reliable when One consequence of storing each facial recognition model in association with a specific user account is that multiple facial recognition models may exist for the same subject if multiple user accounts upload images of the same subject. In addition, the multiple facial recognition models may have varying levels of reliability because each user account may have uploaded a different number of images in which the subject was identified. For example, suppose a user account belonging to two parents uploads one thousand images of their child, while a user account belonging to a friend of the two parents uploads ten images of the child. In this case, the parents' account would have a more refined facial recognition model of the child than the friend's account. To address this issue, the facial recognition module 218 can also share facial recognition models between user accounts, and an example process for sharing facial recognition models is described in detail with reference to FIG. 7.

Figure 3:
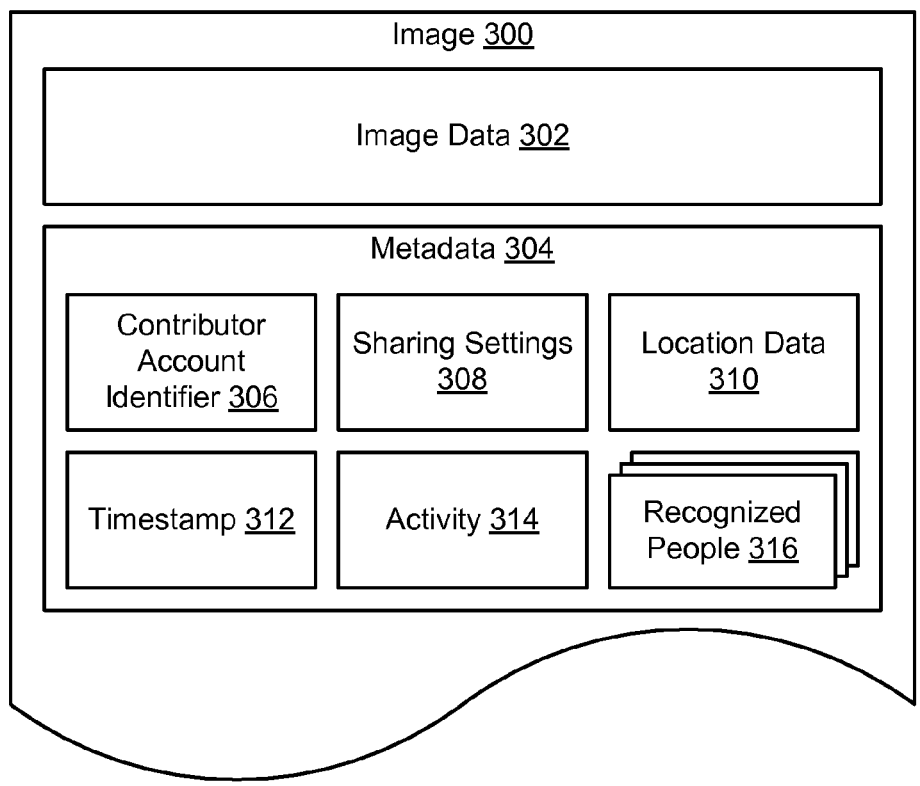
FIG. 3 is a block diagram illustrating an example data structure for an image, in accordance with an embodiment of the invention.

FIG. 3 is a block diagram illustrating an example data structure for an image 300 such as an image from the image store 212, in accordance with an embodiment of the invention. The image 300 contains image data 302 and metadata 304.

The image data 302 is the visual content of the image 300. As described with reference to the image store 212 of FIG. 2, the image data 302 may be a photograph or a video. The image data 302 may be compressed using any combination of lossless or lossy compression methods known in the art, such as run-length encoding, entropy encoding, chroma subsampling, or transform coding.

The metadata 304 includes a contributor account identifier 306, sharing settings 308, location data 310, a timestamp 312, an activity 314, and tags of recognized people 316. The metadata 304 may include additional or different information that is not explicitly shown in FIG. 3, such as identifying information for the camera that was used to capture the image data 302, the optical settings that were used to capture the image data 302 (e.g., shutter speed, focal length, f-number), the resolution of the image data 302, or a caption for the image 300.

The contributor account identifier 306 identifies the user account that was used to upload the image 300 to the image sharing server 110. In one embodiment, the contributor account identifier 306 is the unique account identifier described with reference to the user account store 206 of FIG. 2. Alternatively, the contributor account identifier 306 may be an item of contact information corresponding to the contributor account or some other piece of identifying information.

Figure 6:
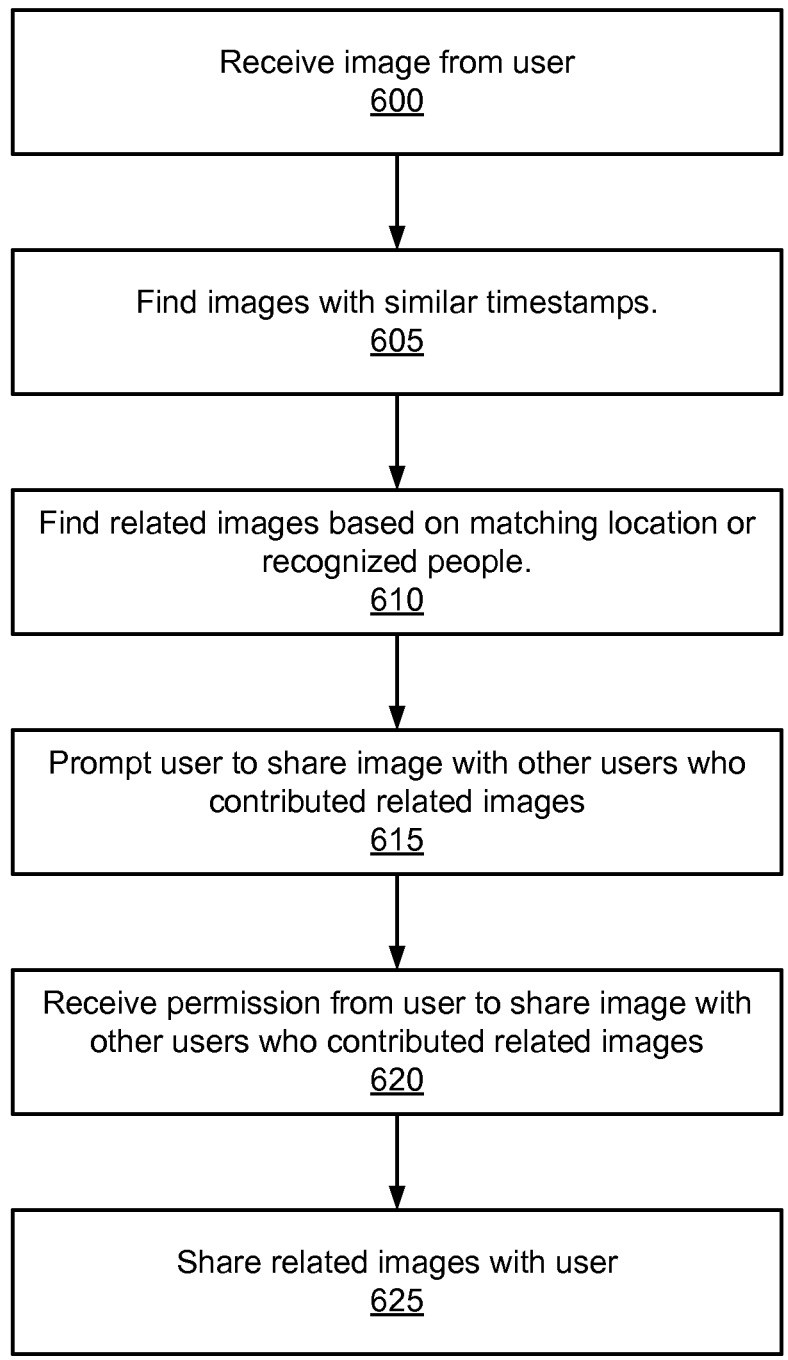
FIG. 6 is a flow chart illustrating a process for prompting a user to share an image with other users, in accordance with an embodiment of the invention.
Figure 7:
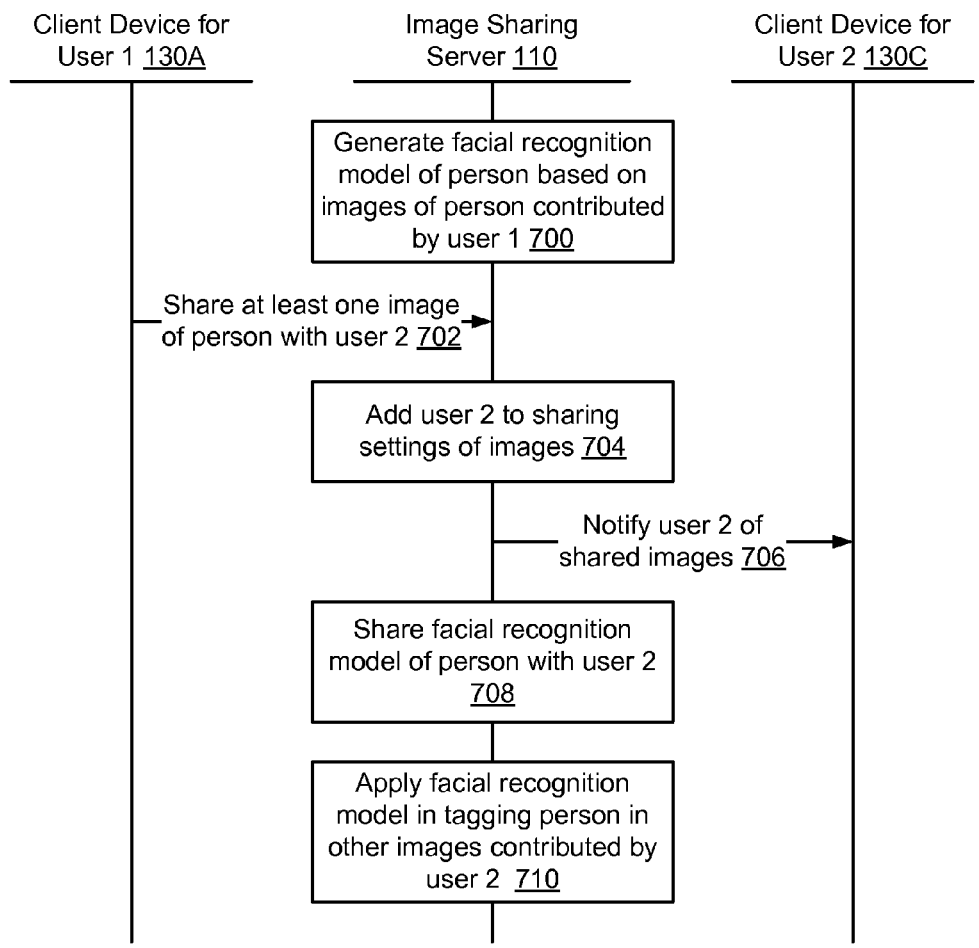
FIG. 7 is an interaction diagram illustrating a process for sharing an image and a corresponding facial recognition model between two user accounts, in accordance with an embodiment of the invention.

The sharing settings 308 is a list of identifiers for additional user accounts and sharing privileges that have been given to each additional user account. Sharing privileges specify the level of access that the contributing user has granted to the additional user accounts. For example, a first user account may only be allowed to view the image, whereas a second user may be allowed to view the image and add tags for additional recognized people 316. In general, the sharing settings 308 may be used to specify a different set of sharing privileges for each additional user account, and each set of sharing privileges specifies which items of metadata 304 the user account is allowed to change. Defining sharing settings 308 in the metadata 304 of an image 300 beneficially allows individual images 300 to be shared between users. FIG. 6 and FIG. 7 describe two example processes in which individual images are shared between users.

In an alternative embodiment, the sharing settings 308 are omitted, and the sharing privileges granted to users are instead stored in association with the corresponding user accounts. In this case, each user account would include a list of identifiers for images 300 that have been shared with the user account, and the sharing privileges that have been granted to the user account for each image 300 would be stored in the user account in association with the corresponding image identifier. In addition, a user may save a caption or some other sort of user-specific annotation in association with an image identifier in his user profile. Saving captions and other user-specific annotations in the corresponding user profiles beneficially allows multiple users to assign different annotations to the same shared image 300.

Similarly, the sharing settings 406 of a memory box 400 may also be omitted in favor of storing memory box sharing privileges in association with the corresponding user accounts. This is described below with reference to FIG. 4.

The location data 310 is information that identifies where the image 300 was taken. The location data 310 may include, for example, coordinates from a global navigation satellite system (GNSS) which are retrieved and recorded by the camera at the time the image 300 is taken. Alternatively, a user may manually add GNSS coordinates to an image at some point after the image 300 is taken. The location data 310 may also contain a textual location descriptor that provides a user-readable label for where the image 300 was taken. For example, the location descriptor may be "Home," "Soccer Field," or "Durham, N.C." A user may manually add a location descriptor. Alternatively, the metadata analysis module 208 may automatically assign a location descriptor to an image 300 based on the location descriptors of other images that were taken at similar GNSS coordinates. Processes for automatically assigning a location descriptor to an image 300 are described in detail with reference to FIG. 6.

The timestamp 312 is the date and time at which the image data 302 was captured. The timestamp 312 may be retrieved from an internal clock of the camera and recorded at the time the image 300 is taken, or it may be manually added or modified by the user after the image 300 is taken.

The activity 314 identifies an event at which the image data 302 was captured. A user may manually define the activity 314 based on pre-existing knowledge of when the image 300 was taken. For example, if a user took a series of images at a soccer game that occurred between 2 PM and 5 PM on Saturday, then the user can manually define the activity 314 for those images as "Saturday afternoon soccer game." After the user uploads the image 300 to the image sharing server 110, the metadata analysis module 208 may also automatically assign an activity 314 to the image 300 based on the activity 314 for other images 300 that were taken at approximately the same time.

The tags for recognized people 316 identify people who are shown in the image data. The tags 316 may be manually added by the user, automatically added by the facial recognition module 318 based on facial recognition models, or added based on a combination of automatic facial recognition and user input. In one embodiment, the tags 316 are links to the corresponding facial recognition models in the facial recognition model store 220. Alternatively, each tag 316 may simply specify a name for the recognized person. In this case, each facial recognition model may be stored in association with the appropriate name so that the tag 316 can still be used to identify a corresponding facial recognition model.

Figure 4:
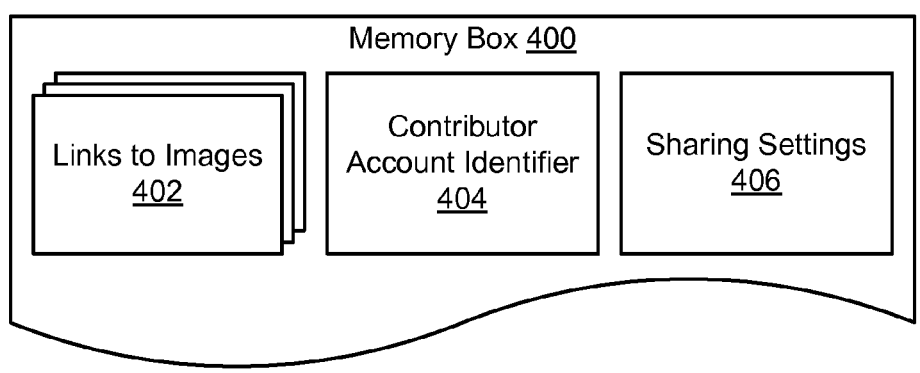
FIG. 4 is a block diagram illustrating an example data structure for a memory box, in accordance with an embodiment of the invention.

FIG. 4 is a block diagram illustrating an exemplified data structure for implementing a memory box 400 from the memory box database 216, in accordance with an embodiment of the invention. As illustrated, the example data structure includes links to images 402, a contributor account identifier 404, and sharing settings 406.

The links to images 402 identify images 300 in the image store 212 that are in the memory box 400. Thus, an image 300 is 'added' to the memory box 400 when a link to the image 300 is added to the image links 402, and an image 300 is 'removed' from the memory box 400 when the corresponding link is removed. In an alternative embodiment, the memory box 400 may hold a copy of the images instead. However, using links 402 is beneficial because the same image can be used in multiple memory boxes without being copied multiple times. This reduces the amount of storage space that is used on the image sharing server 110 and maintains a single set of metadata 304 for the image.

The contributor account identifier 404 identifies the user account for which the memory box 400 was created. Similar to the contributor account identifier 306 described with reference to the image 300 of FIG. 3, the contributor account identifier 404 in a memory box 400 may be the unique account identifier described with reference to the user account store 206 of FIG. 2. Alternatively, the contributor account identifier 404 may be an item of contact information corresponding to the contributor account or some other piece of identifying information. The user account identified in the contributor account identifier 404 has full access privileges to the memory box 400 and is able to add and remove image links 402 and modify the sharing settings 406 of the memory box 400.

Similar to the sharing settings 308 of the image 300 described with reference to FIG. 3, the sharing settings 406 for the memory box 400 is a list of identifiers for additional user accounts and a set of sharing privileges that have been given to each additional user account. A set of sharing privileges defines the specific read/write privileges of an additional user. For example, a set of sharing privileges may specify whether a user is allowed to add images, remove images, or modify images in the memory box 400 (e.g., by adding tags for recognized people or modifying other metadata). A set of sharing privileges may also specify whether a user is allowed to view every image in the memory box or only a subset of the images in the memory box 400. If the user is only allowed to view a subset of the images, then the sharing privileges may define the subset. Alternatively, the subset of images may be predefined (e.g., images that were taken at a particular location, on a particular date, etc).

As described above with reference to the sharing settings 308 of the image 300 in FIG. 3, the sharing settings 406 of the memory box 400 may omitted in favor of storing the sharing privileges for memory boxes 400 in association with the corresponding user accounts. Thus, each user account in the user account database 206 would include a list of identifiers for memory boxes 400 that have been shared with the user account and the corresponding sharing privileges that have been granted.

Sharing Memory Boxes Between Users

Figure 5:
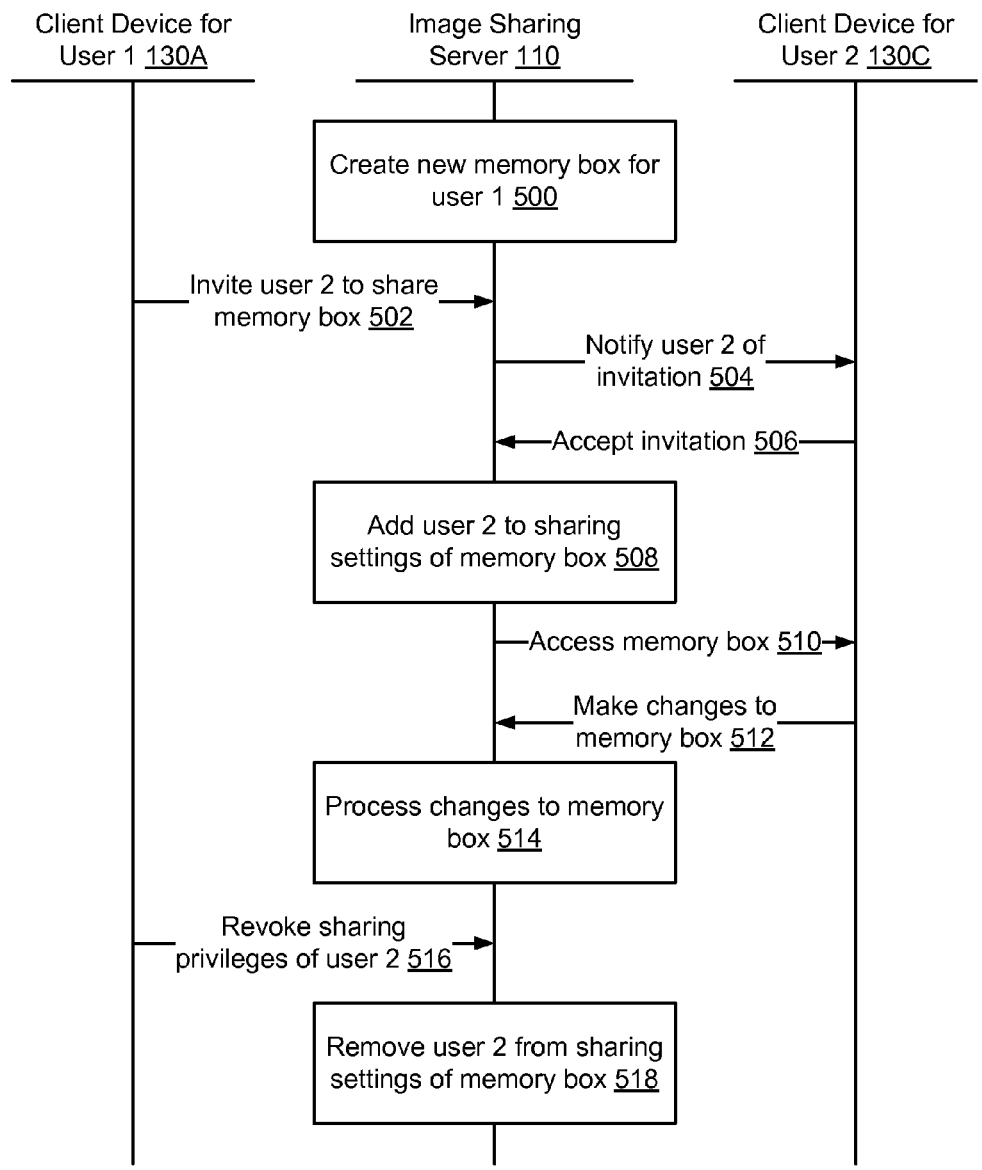
FIG. 5 is an interaction diagram illustrating a process for sharing a memory box between two user accounts, in accordance with an embodiment of the invention.

FIG. 5 is an interaction diagram illustrating a process for sharing a memory box 400 between two user accounts, in accordance with an embodiment of the invention. The process begins when the memory box management module 214 creates 500 a new memory box with images that were contributed by a first user. As described above with reference to FIG. 2, a new memory box 300 can be automatically created in response to the creation of a new user account or manually created at the request of the user. In either case, the memory box management module 214 uses an account identifier corresponding to the first user as the contributor account identifier 406 of the new memory box.

After the memory box is created 500, the first user can use a client device 130A to invite 502 a second user to share the memory box. In the invitation, the first user can specify a set of sharing privileges to be offered to the second user. As described above with reference to FIG. 4, the sharing privileges can specify whether the second user can view images in the memory box, add images to the memory box, remove images from the memory box, or modify the metadata of images in the memory box. Alternatively, the first user can simply send the invitation without specifying a set of sharing privileges. In this case, the second user is given a default set of sharing privileges after accepting the invitation.

The client correspondence module 202 receives the sharing invitation from the first user's client device 130A and notifies 504 the second user of the invitation. If the invitation includes a set of sharing privileges, then the notification includes the sharing privileges. The second user can subsequently review and accept 506 the invitation and sharing privileges. After the client correspondence module 202 receives the acceptance from the second user's client device 130C, it instructs the memory box management module 214 to modify the sharing settings 406 of the memory box by adding 508 an identifier for the second user's user account and a corresponding set of sharing privileges.

Alternatively, the memory box management module 214 may add 508 the second user to the sharing settings 406 of the memory box without having the second user review and accept 506 the invitation. In this case, the second user may receive a notification to inform the second user of the sharing privileges that have been granted.

At any time after the sharing settings 406 are updated with the second user's account and sharing information, the second user can access 510 images in the memory box and make changes 512 to the memory box, as long as the images being accessed and the changes being made are allowed under the sharing privileges that were granted to the second user. Whenever the second user makes a change 512, the client correspondence module 202 receives the change and passes the change on to the appropriate module. For example, requests to add or remove images from the memory box are passed on to the memory box management module 214 so that the corresponding image links 402 can be removed. Meanwhile, requests to change the metadata 304 of an individual image (e.g., to tag an additional recognized person 316) are sent to the image management module 210.

The sharing privileges granted to the second user are not limited to the images that were in the memory box at the time the first user invited 502 the second user. The second user may also access and modify images that were added to the memory box at any time during or after the invitation process (steps 502 through 508). In one embodiment, the client correspondence module 202 may send a notification to the second user when a new image is added to the memory box.

The first user also has the ability to revoke 516 the sharing privileges that were granted to the second user. If the client correspondence module 202 receives a revocation request, the request is passed on to the memory box management module 214, and the memory box management module 214 removes 518 the identifier and sharing privileges for the second user from the sharing settings 406 of the memory box.

If the second user made any changes to the memory box, the memory box management module 214 may optionally reverse the changes. This may include removing images that the second user added to the memory box, restoring images that the second user removed from the memory box, and reversing any changes that the second user made to the metadata of images in the memory box. Alternatively, the memory box management module 214 may allow the second user's changes to remain in place. The memory box management module 214 may also revoke a subset of the changes that were made by the second user. For example, the module 214 may only reverse certain types of changes (e.g., changes to metadata) while allowing other types of changes (e.g., new images added to the memory box) to remain. This may be useful, for example, if the second user contributed meaningful images to the memory box but started making unwanted changes to the metadata of other users' images. In one embodiment, the process of reversing the second user's changes is performed automatically after the memory box management module 214 receives a revocation request. Alternatively, the first user may provide explicit instructions in the revocation request to reverse some or all of the second user's changes.

Although FIG. 5 only illustrates a process for sharing a memory box between two users, steps 502 through 508 can be repeated to share the memory box with an arbitrary number of users. For example, if the memory box contains images being taken during a children's soccer season, then the first user (e.g., a parent of a child on the soccer team) may share the memory box with parents of other children on the soccer team as long as the other parents also have user accounts on the image sharing server 110. This would allow each parent with access to the memory box to add their own soccer images for everyone else to view. Thus, the process described with reference to FIG. 5 beneficially provides a group of users with an easy way of organizing and sharing related images.

Prompted Sharing of Images Based on Related Images

FIG. 6 is a flow chart illustrating a process for prompting a user to share an image 300 with other users who have contributed related images, in accordance with an embodiment of the invention. The process begins when the client correspondence module 202 receives 600 a new image 300 from an uploading user. As described with reference to FIG. 3, images 300 can contain several items of metadata 304. Although a few items of metadata 304, such as the timestamp 312 and the GNSS coordinates of the location data 310, may be added by the client device 130 before the client correspondence module 202 receives the image 300, other items of metadata 304 are added by various modules of the image sharing server 110 during the process of finding 610 related images.

After receiving 600 the uploaded image 300, the client correspondence module 202 sends the image 300 to the metadata analysis module 208 to find related images. As described above with reference to FIG. 2, the metadata analysis module 208 finds related images 300 by finding images that were taken at similar times, and at similar locations or of a similar group of people.

The metadata analysis module 208 starts by finding 605 images with similar timestamps 312 to the uploaded image 300. The search for images with similar timestamps 312 can be performed in a variety of different ways. In one embodiment, the metadata analysis module 208 searches for images within a time interval of the uploaded image 300. The time interval can be a fixed time interval defined by the user or a dynamic time interval generated by the metadata analysis module 208. If the uploading user defines a fixed time interval, the metadata analysis module 208 retrieves images that have timestamps 312 within the fixed time interval. For example, if the uploading user defines a fixed time interval of 15 minutes, then images that were taken less than 15 minutes before or after the uploaded image 300 are retrieved. If a dynamic time interval is used, the metadata analysis module 208 dynamically adjusts the interval as additional images are added and retrieves a cluster of images that fall within the interval. A method of clustering images based on a dynamic time interval is described in co-pending U.S. patent application Ser. No. 13/525,037, which has been incorporated by reference in its entirety.

After finding 605 images with similar timestamps 312, the metadata analysis module 208 finds 610 images that also have a similar location or are of a similar group of people. A search for images with a similar location can also be used to assign a location descriptor to the uploaded image 300. The location search can be performed in a variety of ways. In one embodiment, the GNSS coordinates of the image 300 are matched to predefined regions with labels. For example, there may be predefined regions and corresponding labels for a user's home, the local soccer field, and the city of Durham, N.C. If the GNSS coordinates of the uploaded image 300 falls within a predefined region, then the other images in the predefined region are said to have a similar location. The uploaded image 300 may also be assigned a location descriptor based on the label of the predefined region. In another embodiment, the metadata analysis module 208 establishes a fixed radius around the GNSS coordinates of the uploaded image 300, and any images with GNSS coordinates within the fixed radius are said to have a similar location. In this case, the uploaded image 300 may be assigned a location descriptor based on the location descriptors of the other images in the fixed radius. In still another embodiment, the metadata analysis module 208 uses a dynamically adjusting radius to find images with similar locations and assign a location descriptor to the uploaded image. The dynamic radius technique is described in co-pending U.S. patent application Ser. No. 13/525,037, which has been incorporated by reference in its entirety.

To find images that include a similar group of people, the metadata analysis module 208 begins by sending the uploaded image 300 to the facial recognition module 218 so that tags for recognized people 316 can be added to the metadata 304 of the uploaded image 300. After the tags for recognized people 316 are added, the metadata analysis module 208 searches for images that have tags for the same recognized people 316. In one embodiment, the metadata analysis module 208 may perform a narrow search that only retrieves images that have the exact same set of recognized people. Alternatively, the module 208 may perform a broader search that retrieves images that include the same set of recognized people 316 along with additional recognized people. The module may also perform an even broader search that retrieves images that include a subset of the recognized people 316 in the uploaded image 300. The breadth of the image search may be set manually by the user or automatically set by the metadata analysis module 208. The metadata analysis module 208 may also dynamically widen the breadth of the image search if not enough images are retrieved initially.

An image is determined to be related to the uploaded image 300 if it was taken at a similar time and was also taken at a similar location or contained a similar group of people. Thus, the metadata analysis module 208 can find related images that do not have similar location data 310 if both the timestamp 312 and recognized people 316 are similar. This beneficially allows the metadata analysis module 208 to find related images even if they have insufficient or nonexistent location data 310, or if they were taken in a wide range of locations (e.g., during a walking tour of a city). Similarly, the metadata analysis module 208 can find related images that do not have any tags for recognized people 316 if both the timestamp 312 and the location 310 are similar. This beneficially allows the metadata analysis module 208 find related images that do not have similar tags for recognized people 316, which may be useful for finding related images that were taken at an event that was attended by a large number of people or for finding related images that do not contain any people (e.g., images of landscapes).

After the metadata analysis module 208 finds 605, 610 related images using the process described above, the client correspondence module 202 prompts 615 the uploading user to share the uploaded image 300 with the users who contributed the related images. If the client correspondence module 202 receives 620 permission from the uploading user to share the uploaded image 300, then the image management module 210 modifies the sharing settings 308 of the uploaded image 300 so that the other users are able to view the uploaded image 300. The uploading user may also specify whether to grant additional sharing privileges, such as the ability to modify the metadata of the image 300, to the other users. As described above with reference to FIG. 3, the sharing privileges granted to each user are stored in the sharing settings 308 in association with an identifier for the user.

The image management module 210 may also share 625 the related images with the uploading user by adding the uploading user to the sharing settings 306 of the related images. This may happen automatically after the uploaded image 300 is shared, or the client correspondence module 202 may first request permission from the users who contributed the related images. The uploading user may also be granted additional sharing privileges for the related images.

The related images may also be shared 625 with the uploading user even if the uploading user does not grant permission to share the uploaded image 300 with the users who contributed the related images. This may be useful if the uploading user is embarrassed of his or her photography skills but still wishes to view images of an event that he or she attended. However, since the related images are found by performing a search based on the metadata 304 of the uploaded image 300, the related images cannot be shared with a user who does not possess an image that was taken at the event. Requiring a user to possess an image taken at the event in order to gain viewing access to other images of the event benefits the users of the image sharing server 110 because it provides a measure of comfort that the user was present at the event, rather than being an unrelated individual.

In another embodiment, the client correspondence module 202 prompts the users who contributed the related images to share their related images with the uploading user. In this case, the client correspondence module 202 receives permission from each of the contributing users before sharing the corresponding related images with the uploading user. The client correspondence module 202 may also prompt both the uploading user and the users who contributed the related images.

In still another embodiment, the metadata analysis module 208 searches for related memory boxes instead of directly searching for related images. For example, if a user uploads an image taken at a child's soccer game, the metadata analysis module 208 may prompt the uploading user to add the image with a memory box for images taken during the soccer season. In this case, the memory box would be shared with the uploading user, thus granting the uploading user access to the other images in the memory box.

The process described with reference to FIG. 6 beneficially provides an automated method of finding and sharing related images. Since the image sharing is prompted, there is no need to users to manually find related images by browsing through the images that other users have contributed or performing manual searches. Thus, more images of each event are likely to be shared between users, which improves the overall user experience of the image sharing server 110 and provides users with incentive to upload images of different events.

Sharing Facial Recognition Models Between Users

FIG. 7 is an interaction diagram illustrating a process for sharing an image 300 and a corresponding facial recognition model between two user accounts, in accordance with an embodiment of the invention. First, the facial recognition module 218 generates 700 a facial recognition model of a person based on images of that person that were contributed by a first user. As described above with reference to FIG. 2, the facial recognition module 218 may use any conventional facial recognition technique to generate facial recognition models. In addition, the facial recognition model of a person can be generated based on any arbitrary number of images that contain the person. However, some facial recognition techniques are able to generate a more refined and reliable module if more images of the person are available. The person is added to the tags of recognized people 316 in each image of the person, and the tag links to the corresponding facial recognition model in the facial recognition model database 220.

After the facial recognition model has been generated 700, the first user can use a client device 130A to share 702 images of the person with a second user. The first user can share a single image of the person, a subset of the first user's images of the person, or all of the first user's images of the person. The request to share images may be created manually by the first user, or the request may be the result of the prompted sharing process described with reference to FIG. 6. The client correspondence module 202 receives the first user's request to share the images and instructs the image management module 210 to add 704 an identifier for the second user to the sharing settings 308 of the images. In the request to share the images, the first user may optionally specify a set of sharing privileges to be granted to the second user, and the sharing privileges are stored in the sharing settings 308 in association with the identifier for the second user. The client correspondence module 202 may also send a notification 706 to a client device 130C for the second user to inform the second user of the shared images. The notification can be sent either before or after the second user is added 704 to the sharing settings 308.

In addition to sharing the images with the second user, the image sharing server 110 also shares 708 the facial recognition model of the person with the second user. This allows the facial recognition module 218 to apply the first user's model in tagging 710 the person in images that were contributed by the second user. If the second user did not already have a model of the person, then the facial recognition module 218 creates a copy of the first user's model and associates the copy with the second user, thus allowing the second user to use the copy of the first user's model to tag the person in the second user's images.

If the second user already had a model of the person, then the facial recognition module 218 applies the first user's model to refine the second user's model. For example, if the first user's model was generated based on 1000 images of the person and the second user's model was generated based on only 10 images of the person, then the second user's model would become dramatically more accurate. In this case, the second user's facial recognition model can also be used to refine the first user's model if at least one of the 10 images used to generate the second user's model had not been used when generating the first user's model.

To simplify and clarify the figure and the corresponding description, FIG. 7 only illustrates a process for sharing a single facial recognition model. However, the same process can be used to share multiple facial recognition models at once. In particular, if the first user shares an image or a series of images that contain multiple recognized people, then the corresponding facial recognition models for each person can also be shared.

The process described with reference to FIG. 7 allows a refined facial recognition model based on many images to be shared between users without sharing the images that were used to generate the model. This is advantageous because other users can use the more refined (and thus more accurate and reliable) facial recognition model to recognize the corresponding person in their own images, but the user who contributed the images that were used to generate the refined model does not have to share all the images used to refine the model with the other users. This beneficially preserves the privacy of the user and the people in the images. For example, suppose a user has 90 images of a friend at a party and 10 images of the friend picking out a pet rabbit at an animal shelter. The facial recognition module 218 can use all 100 images to generate and refine a facial recognition model for the friend. If the user only wishes to share the 10 animal shelter images with a second user, the image sharing server 110 shares the refined facial recognition model for the friend without sharing the 90 party images with the second user. Thus, the facial recognition model that was generated based on all 100 images of the friend can be used to more accurately identify the friend in the second user's images.

Physical Components of a Computer

Figure 8:
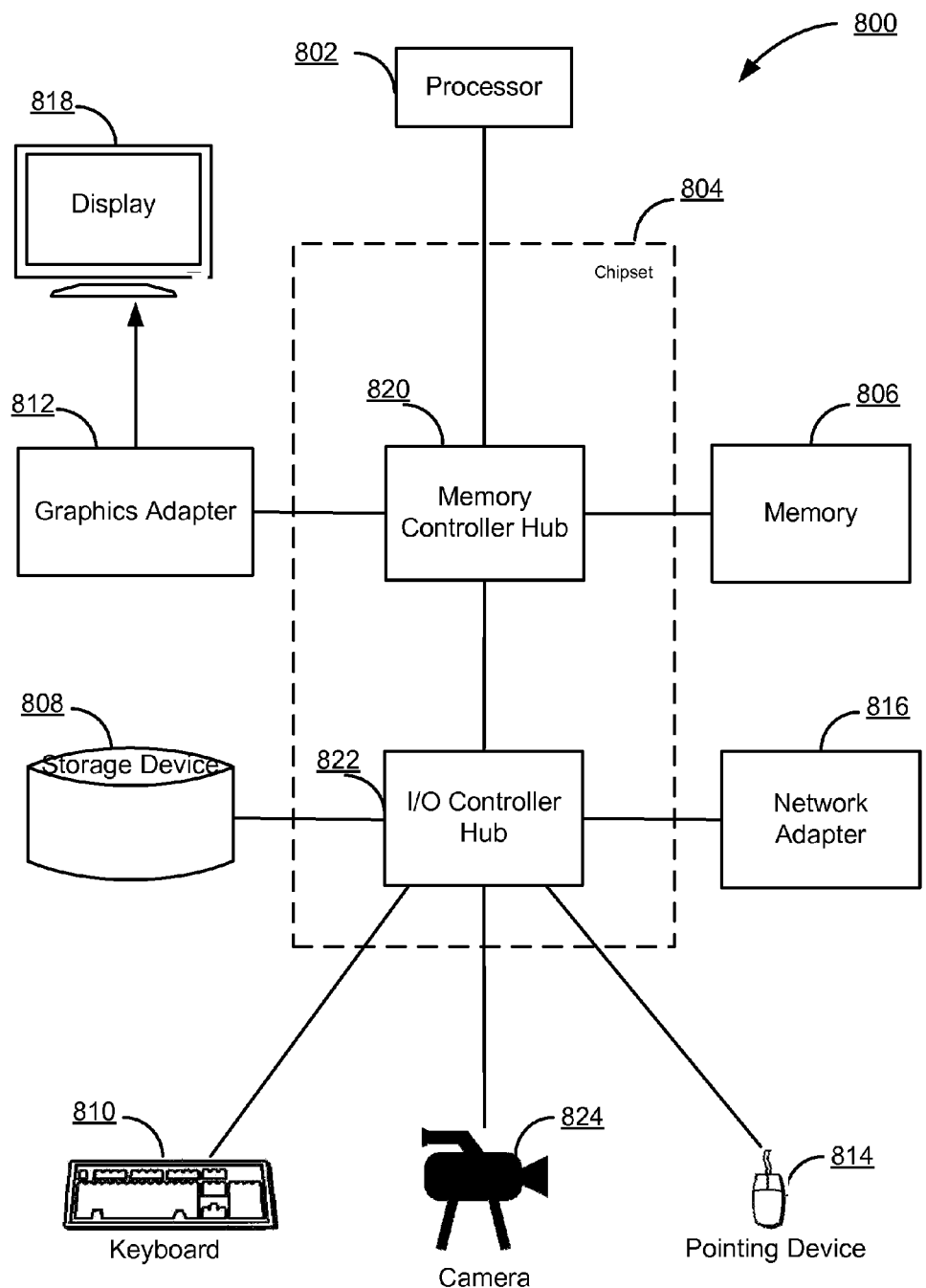
FIG. 8 is a block diagram of the components of a computing system for use, for example, as the image sharing server or the client devices depicted in FIG. 1, in accordance with an embodiment of the invention.

FIG. 8 is a block diagram of the components of a computing system 800 for use, for example, as the image sharing server 110 or client devices 130 depicted in FIG. 1, in accordance with an embodiment of the invention. Illustrated are at least one processor 802 coupled to a chipset 804. Also coupled to the chipset 804 are a memory 806, a storage device 808, a keyboard 810, a graphics adapter 812, a pointing device 814, a network adapter 816, and a camera 824. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a network.

The camera 824 captures digital photographs and videos. As is known in the art, the camera 824 includes an image sensor and an optical system (e.g., one or more lenses and a diaphragm), in addition to other components. The camera 824 may also include a microphone for capturing audio data, either as standalone audio or in conjunction with video data captured by the image sensor. In one embodiment, the camera 824 is a separate computing device with its own processor, storage medium, and memory (e.g., a point-and-shoot or DSLR camera), and the camera 824 is coupled to the I/O controller hub through an external connection (e.g., USB). Alternatively, the camera 824 may be a component of the computing system 800 (e.g., an integrated camera in a smart phone, tablet computer, or PDA).

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, display 818, and/or camera 824. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for performing the embodiments of the invention. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for managing and improving face recognition across user accounts in a computer network system, comprising:
   storing a first account comprising a plurality of images for a first user in a database;
   constructing, by one or more image servers, a first face model for a person using a first set of images in the first account, the first set of images each depicting the person's face;
   storing a second account comprising a plurality of images for a second user in the database;
   constructing, by the one or more image servers, a second face model for the same person using a second set of images in the second account, the second set of images each depicting the person's face, wherein number of images in the first set of images is different from number of images in the second set of images;
   sharing the first face model with the second user account; and
   recognizing, by the one or more image servers, faces of the person in the images in the second account at least in part based on the first face model.

2. The computer-implemented method of claim 1, further comprising:
   revising the second face model using the first face model to obtain a refined second face model; and
   recognizing, by the one or more image servers, faces of the person in the images in the second account based on the refined second face model.

3. The computer-implemented method of claim 2, wherein the second face model is revised while the first set of images in the first account are not shared with the second account.

4. The computer-implemented method of claim 1, further comprising:
   storing a tag of recognized people in association with each of the images in the first set of images and the second set of images, the tag indicating that the person is identified;
   storing a first link to the first face model in association with each tag associated with each of the images in the first set of images; and
   storing a second link to the second face model in association with each tag associated with each of the images in the second set of images.

5. The computer-implemented method of claim 4, further comprising:
   after the first face model is shared with the second user account, storing a third link to the first face model in association with each tag associated with each of the images in the second set of images.

6. The computer-implemented method of claim 1, further comprising:
   receiving a permission from the first user to share the first face model with the second user account.

7. A computer-implemented method for managing and improving face recognition across user accounts in a computer network system, comprising:
   storing a first account comprising a plurality of images for a first user in a database;
   constructing, by one or more image servers, a first face model for a person using a first set of images in the first account, the first set of images each depicting the person's face;
   storing a second account comprising a plurality of images for a second user in the database;

constructing, by the one or more image servers, a second face model for the same person using a second set of images in the second account, the second set of images each depicting the person's face, wherein number of images in the first set of images is different from number of images in the second set of images;

sharing the first set of images with the second user account; and revising the second face model using the first set of images to obtain a refined second face model.

8. The computer-implemented method of claim 7, further comprising:

recognizing, by the one or more image servers, faces of the person in the images in the second account based on the refined second face model.

9. The computer-implemented method of claim 7, further comprising:

storing a tag of recognized people in association with each of the images in the first set of images and the second set of images, the tag indicating that the person is identified;

storing a first link to the first face model in association with each tag associated with each of the images in the first set of images; and storing a second link to the second face model in association with each tag associated with each of the images in the second set of images.

10. The computer-implemented method of claim 7, further comprising:

receiving a permission from the first user to share the first set of images with the second user account.

11. A computer-implemented method for managing and improving face recognition across user accounts in a computer network system, comprising:

storing a first account comprising a plurality of images for a first user in a database;

constructing, by one or more image servers, a first face model for a person using a first set of images in the first account, the first set of images each depicting the person's face;

storing a second account comprising a plurality of images for a second user in the database, wherein a second set of images in the second account each depicts the person's face, wherein no face model has been developed for the person in the second account;

sharing the first face model with the second user account; and recognizing, by the one or more image servers, faces of the person in the images in the second account at least in part based on the first face model.

12. The computer-implemented method of claim 11, wherein the first face model is revised while the first set of images in the first account are not shared with the second account.

13. The computer-implemented method of claim 11, further comprising:

storing a tag of recognized people in association with each of the images in the first set of images and the second set of images, the tag indicating that the person is identified;

storing a first link to the first face model in association with each tag associated with each of the images in the first set of images; and after the first face model is shared with the second user account, storing a second link to the first face model in association with each tag associated with each of the images in the second set of images.

14. The computer-implemented method of claim 11, further comprising:

receiving a permission from the first user to share the first face model with the second user account.

\* \* \* \* \*